United States Patent [19]

Takeichi

[11] 4,359,627
[45] Nov. 16, 1982

[54] PREHEATER MOUNTED WITHIN A WELL

[75] Inventor: Yasuo Takeichi, Ichikawa, Japan

[73] Assignee: Daido Sangyo Co., Ltd., Chiba, Japan

[21] Appl. No.: 196,035

[22] Filed: Oct. 10, 1980

[30] Foreign Application Priority Data

May 23, 1980 [JP]  Japan .................. 55-70967
May 23, 1980 [JP]  Japan .................. 55-70968

[51] Int. Cl.³ .............................. H05B 3/80
[52] U.S. Cl. ............................. 219/523; 219/278;
    219/381; 219/536; 338/229; 166/60
[58] Field of Search ............... 219/213, 277, 278, 316,
    219/415, 381, 437, 523, 536, 542, 544, 549, 552;
    166/60; 338/208, 210, 229

[56] References Cited

U.S. PATENT DOCUMENTS

| | | | |
|---|---|---|---|
| 969,849 | 9/1910 | Dyer | 219/523 X |
| 1,086,646 | 2/1914 | Christian | 219/523 X |
| 2,055,500 | 9/1936 | McLeod | 219/213 |
| 2,507,750 | 5/1950 | Barlow | 219/523 X |
| 2,518,265 | 8/1950 | Adamson | 338/229 X |
| 2,888,546 | 5/1959 | Kinney | 219/381 X |
| 3,731,058 | 5/1973 | Bleiweiss | 219/523 |

Primary Examiner—Volodymyr Y. Mayewsky
Attorney, Agent, or Firm—Fidelman, Wolffe & Waldron

[57] ABSTRACT

A preheater is disclosed which can be inserted and withdrawn from a well tube defining a curved passage, without having its heating element damaged, by utilizing the flexibility of a spirally coiled structure having increased stability of shape and excellent capacity of restoring its original shape after elastic deformation.

7 Claims, 10 Drawing Figures

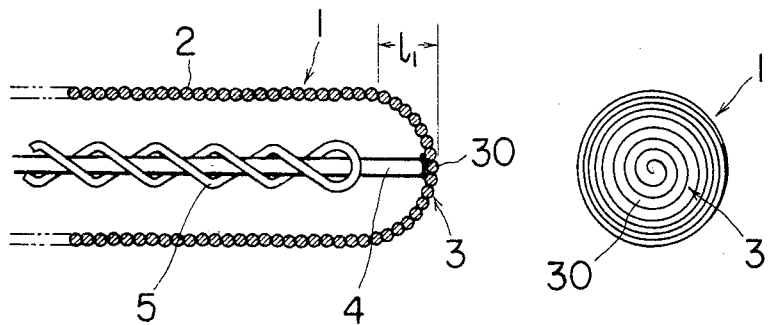
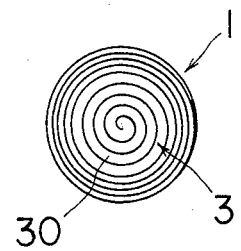
Fig. 1
Fig. 2
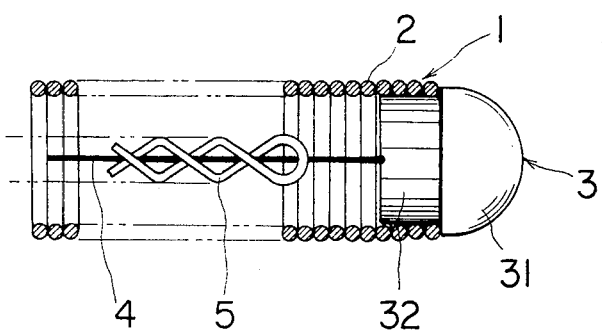
Fig. 3
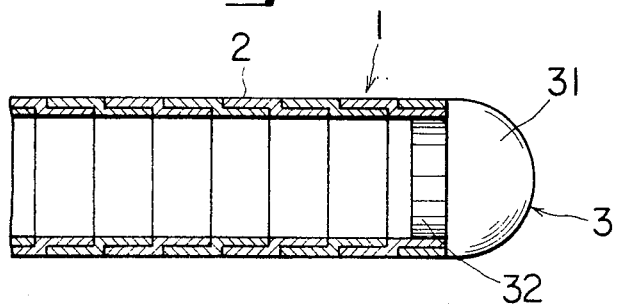
Fig. 4

PREHEATER MOUNTED WITHIN A WELL

BACKGROUND OF THE INVENTION

1. Field of the Invention

This invention relates to a preheater of the type mounted within a well, and more particularly, to a heater adapted to preheat sodium or the like for use as a cooling medium in a nuclear reactor, by heating a pipeline defining a sodium passage.

2. Description of the Prior Art

The sodium which is circulated through a pipeline for cooling a nuclear reactor need be preheated to a desired temperature. It has hitherto been usual to provide a sheathed heater along the surface of the pipeline for sodium so that it may heat the pipeline to thereby preheat the sodium. The heater has its own life, and also requires maintenance and inspection from time to time, leading to the necessity for its dismantling and replacement. The heater is, however, located in the vicinity of a nuclear reactor, and it is very dangerous for a man to have any direct access to the location of the heater for doing the necessary work therefor. It has, therefore, been strongly desired to make it possible for a man to dismantle and replace any such heater without approaching such a dangerous place.

This desire can most effectively be satisfied by providing a fixed well tube along a pipeline for sodium, and securing a removable heater within the well tube. The worker has only to place an elongated heater into the well tube, or take it out, through a tube opening located at a sufficiently distant place from the reactor. He is not exposed to any danger of radioactive contamination when dismantling or replacing the heater. Although the use of a well tube for removable installation of the heater is very advantageous as hereinabove mentioned, the sodium pipeline connected to the reactor, which is never straight, but complexly bent, necessarily requires a well tube which is bent along the sodium pipeline. More specifically, the use of such a well tube for mounting a preheater for the sodium pipeline for a nuclear reactor has heretofore required the heater to satisfy the following conditions:

(a) As the sodium pipeline follows a route which is not only straight, but also complexly bent, the well tube installed along the sodium pipeline also follows a complexly bent route, and has a substantial total length. Therefore, the heater must be sufficiently flexible to be properly placed into, and out of the well tube.

(b) The heater must be able to withstand a temperature of at least 500° C., because the temperature of the heater in the well tube is expected to exceed 400° C. in order to preheat the sodium pipeline to a temperature usually in the approximate range of 200° C. to 300° C.

(c) The heater is required to permit not only easy insertion into the well tube, but also easy withdrawal therefrom.

(d) Since the sodium pipeline has such a temperature gradient along its length that in the vicinity of the reactor, its temperature is raised by the transfer of heat from the reactor, while that portion of the pipeline which is located outside the vessel which contains the reactor remains at room temperature unless preheated, it is necessary for the heater to have an adjustable output distribution in order to preheat the pipeline uniformly along its entire length.

(e) The heater is required to have a sufficiently high mechanical strength to withstand the frictional force, bending stress and torsion to which the heater is subjected when it is inserted into the well tube, or withdrawn therefrom.

No heater known in the art has satisfied all of the aforementioned requirements, but heretofore, the use of any such well tube has been employed for only a substantially limited portion of the sodium pipeline which extends in a straight line through the wall of the reactor vessel, despite the excellent advantages provided by the aforementioned method for mounting the heater. It is true that the area in the exterior of the wall of the reactor vessel contains less radioactivity, but it is never safe for anybody to engage for a long period of time in the work which has to be done in such an environment. It has, thus, been desired to find a solution to that problem.

SUMMARY OF THE INVENTION

It is therefore an object of the present invention to provide a heater which can be inserted into a well tube at a point spaced sufficiently apart from a reactor vessel to assure perfect safety against radioactive contamination, for installation along a bent pipeline for sodium up to a point in close proximity to the reactor vessel, and which can be smoothly inserted into, and withdrawn from, the well tube extending along the bent sodium pipeline.

It is another object of this invention to provide such a heater having a sufficiently high degree of heat resistance.

It is a further object of this invention to provide such a heater having sufficiently high mechanical strength to enable it to withstand the entirely different kinds of external forces which act thereon during its insertion into, and withdrawal from, the well tube, and the frictional or other external forces which act thereon during its movement in the well tube.

The heater of this invention, by which the aforementioned objects are attained, is characterized by comprising a tightly wound coil of the spiral form adapted to absorb any force that may act on the heater during its insertion into a well tube, a core adapted to absorb any force that may act on the heater during its withdrawal from the well tube, and a spirally coiled heating element assembly.

Other and further objects, features and advantages of the invention will become apparent from the following description of embodiments with reference to the accompanying drawings.

BRIEF DESCRIPTION OF THE DRAWINGS

FIG. 1 is a fragmentary longitudinal sectional view showing the construction of one end of a heater embodying this invention;

FIG. 2 is a front elevational view of the heater shown in FIG. 1;

FIG. 3 is a fragmentary longitudinal sectional view showing the construction of one end of the heater according to another embodiment of this invention;

FIG. 4 is a longitudinal sectional view showing the head of a modified form of the coil;

DETAILED DESCRIPTION OF THE INVENTION

Figure 5:
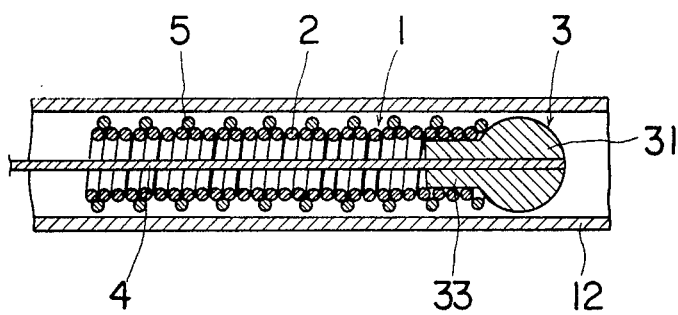
FIG. 5 is a longitudinal sectional view showing the construction of one end of the heater according to still another embodiment of this invention as mounted in a well tube.

Referring now more particularly to the drawings, the heater of this invention comprises a coiled housing 1 including an elongated cylindrical coiled body 2 formed by winding a wire or narrow strip of metal tightly in a spiral pattern, and having one end connected integrally with a head 3 having a semispherically projecting front surface, a core 4 extending in the coiled housing 1 along its entire length, and having one end secured to the head 3, and a spirally coiled heating element assembly 5 extending along the coiled housing 1, and formed by a single microheater wire folded back into two halves wound about each other.

The coiled body 2 forming a major part of the coiled housing 1 preferably comprises a coil formed by winding an Inconel wire or the like tightly in a spiral pattern, so that the coiled housing 1 may render the heater sufficiently rigid to transmit pressure properly along its own length for proper insertion into a well tube 12 without bending unintentionally, and sufficiently flexible to bend or deform itself easily along the curved route of the well tube 12, and may further impart a sufficiently high degree of heat resistance to the heater.

The head 3 of the coiled housing 1 has a semispherically projecting front surface in order to ensure that when the heater is inserted into the well tube 12, the leading end of the coiled housing 1 easily bends or deforms itself along the curvature of the well tube 12, and be pushed forward in the direction of the curvature of the well tube 12 by any curved inner surface portion thereof upon abutting thereon. The front surface of the head 3 is, however, not necessarily limited to a semispherically projecting one, but may alternatively have any other configuration, such as of a paraboloid of revolution, or an ellipsoid, if it ensures that whenever the head 3 abuts on the curved inner surface of the well tube 12, it enable the head 3 to be directed forward along the curvature of the inner surface of the well tube 12 without being caught thereby.

The core 4 is provided for exerting onto the heater a force of withdrawal from the well tube 12. It can bend or deform itself in unison with the coiled housing 1, and yet, it has a sufficiently high tensile force to withdraw the heater from the well tube 12. The core 4 is formed from a material having sufficiently high degree of heat resistance.

The core 4 extends through the coiled housing 1 along its entire length. It has one end secured firmly to the rear surface of the head 3 of the coiled housing 1, and is adapted to transmit to the head 3 a tensile force for withdrawing the heater from the well tube 12. Therefore, the spirally coiled body 2 of the coiled housing 1 is subjected to a compressive force both when the heater is inserted into the well tube 12, and when it is withdrawn therefrom, so that the coiled body 2 remains tightly wound at all times except where it is bent or deformed at each bend of the well tube 12.

Figure 7:
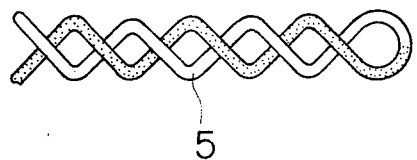
FIG. 7 is a view illustrating the construction of a preferred form of the heating element assembly.

The heating element assembly 5 has a spirally coiled form so that it may be capable of bending or deforming itself along the curvature of the well tube 12 in unison with the coiled housing 1 and the core 4. It comprises a single microheater wire folded back into two halves wound about each other, so that it may have a pair of ends brought together adjacent to the base end of the coiled housing 1. As best shown in FIG. 7, the single microheater wire by which the heating element assembly 5 is formed has a first half coiled in one direction, is folded back, and has its second half wound in the opposite direction about its first half. In FIG. 7, the first half of the wire is identified by a lot of fine dots, while no such dot is used to show the second half.

Figure 8:
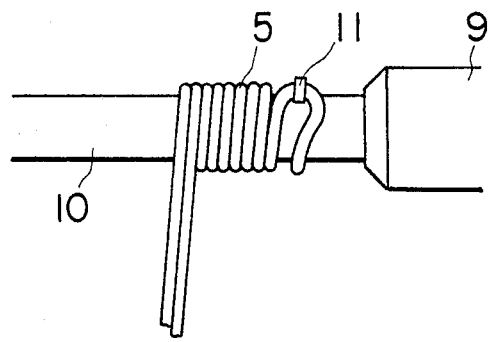
FIG. 8 is a view illustrating by way of example a device for forming the heating element assembly shown in FIG. 7.

FIG. 8 shows, by way of example, a method of winding the microheater wire into a coil. According to this method, a coiling core 10 is secured to a chuck 9, and a single microheater wire is folded back into two halves. That point of the wire about which it is folded back is engaged around a lug 11 secured to the core 10, and the two parallel halves of the wire are wound about the core 10. Then, the coil formed on the core 10 is expanded until it has a desired pitch between every two adjoining turns thereof.

Figure 10:
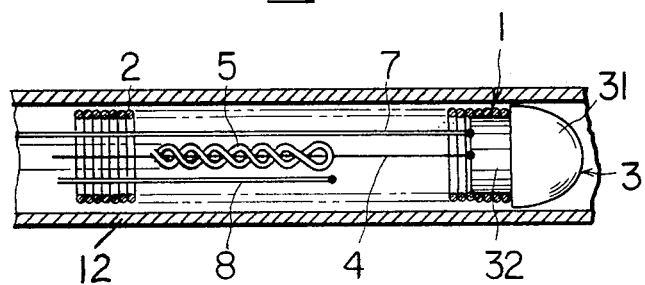
FIG. 10 is a fragmentary longitudinal sectional view showing the construction of one end of the heater according to a further embodiment of this invention.

The foregoing description has set forth the basic construction of the heater according to this invention. Attention is now directed to FIG. 10 showing an embodiment adapted for use in the event a heater, having an output distribution which can be controlled along its length, is required for preheating a sodium pipeline uniformly along its length when the sodium pipeline and the well tube 12 have a temperature gradient therealong.

According to the arrangement shown in FIG. 10, an open space is provided between the coiled housing 1 and the core 4 for accommodating a first thermocouple 7 having a thermojunction welded to the head 3 of the coiled housing 1, and a second thermocouple 8 having a thermojunction spaced a predetermined distance rearwardly of the head 3. By virtue of its construction as hereinabove described, the embodiment shown in FIG. 10 makes it easy to determine how far the heater should be inserted into the well tube 12 mounted along the sodium pipeline.

When the heater is inserted into the well tube 12, its depth of insertion is a critical factor. As the well tube 12 extends along the sodium pipeline leading to a reactor vessel, and reaches the reactor vessel, a portion of the sodium pipeline which is close to the reactor vessel is overheated, because it is not only heated by the heater, but also its temperature is raised by the heat conducted from the reactor vessel, as already pointed out. The arrangement as shown in FIG. 10 is, therefore, advantageous, since the thermocouples 7 and 8 provide a means for measuring the temperature of the heater in the vicinity of its leading end, and make it possible to locate the leading end of the heater properly in the well tube 12. The use of the two thermocouples 7 and 8 is advantageous, because their relative positions and the temperatures detected thereby assist the presumption of a temperature distribution along the sodium pipeline.

Although the basic construction of the heater according to this invention has hereinbefore been described, a number of variations or modifications may be made in the construction of the head 3 of the coiled housing 1, the coiled body 2, and combination of the coiled housing 1 and the heating element assembly 5, as will hereinafter be described by way of example.

Referring first to FIGS. 1 and 2, a modified form of the head 3 for the coiled housing 1 shown therein comprises a spiral head 30 formed by an extension of the wire defining the coiled body 2, but having a gradually decreasing diameter to define a semispherical surface. The head 3 shown in FIGS. 1 and 2 is completely integral with the coiled body 2. Therefore, it is possible to improve the strength of the coiled housing 1 as a whole, and form the coiled housing 1 by a single cycle of operation. As the spiral head 30, however, has a front surface defined by a combination of a plurality of thin, annular smooth surfaces, it is likely to be caught by the curved inner surface of the well tube 12, if the latter is uneven to some extent or other. It is also necessary to ensure a sufficiently strong mechanical connection among the turns of wire forming the spiral head 30 to prevent the central portion of the spiral head 30 from being depressed inwardly by any tensile force applied for withdrawing the heater from the well tube 12.

As a matter of fact, however, the head 3 shown in FIGS. 1 and 2 is hardly caught by the curved inner surface of the well tube 12, because the inner surface of the well tube 12 is hardly uneven. Moreover, as the spiral head 30 is formed by winding in a forwardly projecting form with a gradually decreasing diameter, there is practically no fear of central depression in the spiral head 30, as a plurality of turns of wire defining the head overlap one another to hold it against any tensile force transmitted through the core 4, if the wire is strong enough.

The head 3 shown in each of FIGS. 3, 4, 5 and 10 is formed separately from the coiled body 2, and secured thereto to form the coiled housing 1. The head 3 is formed from an Inconel alloy or stainless steel, and is comparable to the coiled body 2 in heat resistance. The head 3 basically comprises a semispherical head 31 having a generally semispherically projecting front surface, and a fitting member 32 projecting rearwardly from the semispherical head 31 and adapted for engaging in the coiled body 2. The semispherical head 31 is not only connected to the coiled body 2 by mere engagement of its fitting member 32 in the coiled body 2, but their connection is reinforced by welding of the fitting member 32 to the coiled body 2. The head 3 shown in FIG. 3, and the like is advantageously free from any danger of being caught by the inner surface of the well tube 12, since its front surface has a completely smoothly projecting configuration. Moreover, as the head 3 as a whole is a completely unitary product, it is never likely to collapse when subjected to any tensile force through the core 4. Special work is, however, required for connecting the head 3 rigidly to the coiled body 2 which is formed separately from the head 3.

Figure 6:
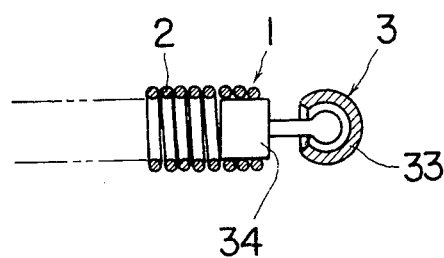
FIG. 6 is a fragmentary longitudinal sectional view showing the head of a different form of the coil.

Reference is now made to FIG. 6 showing still another form of the head 3 having an improved freedom from any danger of being caught by the curved inner surface of the well tube 12, and so constructed as to bend more freely and flexibly in the direction of the curvature of the well tube 12 whenever abutting on the inner surface of any bend in the well tube 12. The head 3 shown in FIG. 6 comprises a fitting member 34 fitted in one end of the coiled body 2 and secured thereto by welding, and provided in the center of its front surface with an integrally projecting member having a spherical joint at its free end, and a partially cut and open spherical shell 33 engaged about the spherical joint on the fitting member 34 undetachably, but rotatably thereabout within a certain angular range. Despite its more complicated construction, the head 3 shown in FIG. 6 is advantageously capable of turning in the direction of any curvature of the well tube 12 by virtue of rotation of its spherical shell 33 whenever abutting on the inner surface of any bend in the well tube 12 as already set forth, so that the heater as a whole can very smoothly bend or deform itself along the well tube 12.

The coiled body 2 forming the coiled housing 1 with the head 3 is advantageously easy to form if a wire or like material is coiled in a spiral pattern. From the standpoint of its mechanical strength, however, it is preferable to form the coiled body 2 by winding a narrow Inconel strip tightly in a spiral and partially overlapping pattern as shown in FIG. 4. The coiled body 2 shown in FIG. 4 comprises a narrow Inconel strip having a transverse cross section curved substantially along its longitudinal centerline in the form of a crank with a curved depth which is equal to the strip thickness. This construction advantageously provides the coiled body 2 with a smooth surface between every two adjoining turns of strip that overlap each other in a tightly fit fashion.

Description will now be made of the manner in which the heating element assembly 5 is connected to the coiled housing 1. As the coiled housing 1 is intended as a means for inserting and positioning the heating element assembly 5 in the well tube 12, the heating element assembly 5 can extend along the entire length of the coiled housing 1. The heating element assembly 5 is required to be as flexible as the coiled housing 1, and should not get deformed in any way independently of the coiled housing 1. Therefore, it is necessary to mount the heating element assembly 5 in the coiled housing 1 in such a manner that the heating element assembly 5 may be moved forward or backward, and bend or deform itself, within the well tube 12 in unison with the coiled housing 1.

FIGS. 1, 3 and 10 show a first example of the mode in which the heating element assembly 5 is attached to the coiled housing 1. According to this example, the heating element assembly 5 extends along the core 4 secured to the coiled housing 1, and is wound about it. Thus, the heating element assembly 5 is located within the coiled housing 1. As is obvious from such arrangement, the heating element assembly 5 is mechanically protected by the coiled housing 1, so that it may not be directly pressed or rubbed against the inner surface of the well tube 12 at any bend thereof when the heater is inserted into the complexly curved passage defined by the well tube 12. This arrangement makes it possible to use a heating element assembly made of a material having a relatively low mechanical strength without involving any problem. Moreover, each unit length of the heater requires only a small length of the heating element assembly 5, since it is wound about the core 4 having a small thickness or diameter.

Attention is now directed to FIG. 5 showing a second example of the manner in which the heating element assembly 5 is attached to a combination of the coiled housing 1 and the core 4. According to this example, the heating element assembly 5 is wound spirally around the coiled housing 1, as is obvious from FIG. 5. According to this arrangement, it is clear that the heating element assembly 5 can perform a very effective preheating job, since it is brought into close proximity to the wall of the well tube 12 when the heater is positioned within the well tube 12. The heating element assembly 5 is, however, required to have a high mechanical strength, because it is located outside of the coiled body 2, and is heavily rubbed against the inner surface of the well tube 12 during its insertion, use and withdrawal. Moreover, the heating element assembly 5, which is merely wound about the coiled body 2 at a predetermined pitch, is likely to be displaced by its frictional contact with the inner surface of the well tube 12.

Figure 9:
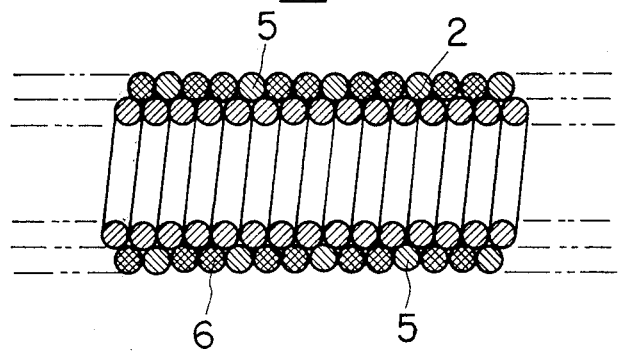
FIG. 9 is a fragmentary enlarged longitudinal sectional view showing a modified form of the heater shown in FIG. 5.

FIG. 9 shows an arrangement which provides an effective solution to the problems of mechanical strength and displacement encountered with the arrangement shown in FIG. 5. Referring to FIG. 9, the improved arrangement employs a heat resistant wire 6 having a diameter which is equal to, or slightly larger than that of the heating element assembly 5, and wound about the coiled body 2 at the same pitch as the heating element assembly 5 so as to fill the open spaces left between the turns of the heating element 5 around the coiled body 2. The heating element 5 and the heat resistant wire 6 form in combination a tightly wound coil which eliminates any possibility of the heating element 5 being undesirably displaced, or pressed strongly against the inner wall of the well tube 12. Moreover, the heating element 5 and the heat resistant wire 6 are wound around the coiled body 2 at a largely different pitch than the wire forming the coiled body 2. Therefore, even if the heater is bent or deformed in the curved interior of the well tube 12 to loosen the coiled body 2 and form any gap therein, there is no fear that the heating element 5 or the heat resistant wire 6 may undesirably fall in any such gap in the coiled body 2.

The heater of this invention as hereinabove described can be placed in the well tube 12 if pressure is applied to the coiled body 2 to push the heater gradually into the well tube 12. When the heater has arrived at any bend in the well tube 12, the flexibility of the coiled body 2 and the generally semispherically projecting surface of the head 3 cause the heater to be bent along the route defined by the well tube 12, and inserted smoothly thereinto. When the heater is situated in a position within the well tube 12 as determined by the length of the heater or in accordance with the signals transmitted from the thermocouples 7 and 8, it is maintained in that position, and an electric current is supplied to the heating element assembly 5 to preheat a pipeline for sodium associated therewith.

If any necessity has arisen for removing the heater from its position alongside the sodium pipeline, a tensile force can be applied to the core 4 to withdraw the heater from the well tube 12. The tensile force applied to the core 4 acts on the head 3, which in turn transmits pressure onto the coiled body 2. Therefore, the tightly wound wire forming the coiled body 2 is never loosened or deformed by the tensile force applied for withdrawing the heater from the well tube 12.

It will be understood from the foregoing description that the heater of this invention can be installed and removed very safely through the opening of the well tube 12 spaced a sufficiently long distance from a reactor vessel to assure full safety against radioactive contamination, for installation in the well tube 12 in close proximity to the reactor vessel, or withdrawal therefrom. Moreover, as it is elongated and sufficiently flexible, the heater of this invention can be smoothly inserted into the complexly curved interior of the well tube 12, and withdrawn therefrom.

There is no fear that the spirally coiled heating element assembly 5 may be loosened and fail to provide a uniform distribution of heat, or be broken, because no compressive or tensile force acts thereon during its insertion into the well tube 12, or removal therefrom.

Although the invention has been described in its preferred form with a certain degree of particularlity, it is understood that the present disclosure of the preferred form has been changed in the details of construction and the combination and arrangement of parts may be resorted to without departing from the spirit and the scope of the invention as hereinafter claimed.

What is claimed is:

1. A heater assembly for insertion into and withdrawal from a tube curved along its length, said heater assembly comprising:
   a generally hemispherically shaped heat resistant head means for engaging the inner surface of said tube and following the lengthwise curvature of said tube during the insertion of said assembly;
   core means for withdrawing said head means from said tube, and comprising a heat resistant material attached to said head means and extending substantially the entire length of said assembly;
   flexible housing means for enclosing said core means in spaced relation with said housing means and comprising a heat resistant material tightly wound into spiral turns to provide a generally tubular configuration having substantially smooth internal and external surfaces, said housing means attached to said head means and extending substantially the entire length of said assembly;
   electric means for heating said tube, said heating means unitary with said assembly and extending along at least a portion of the length of said assembly;
   said core means and said heating means having the characteristics of bending substantially in unison with said housing means along the length of said assembly during insertion into and withdrawal from said curved tube to retain a spaced relation from said housing means; and said core means further comprising means for opposing substantial separation of said spiral turns during said withdrawal.

2. A heater assembly as in claim 1, wherein said heating means comprises:
   a flexible electric microheater wire folded back upon itself into two substantially parallel halves, said halves wound into a generally spiral configuration and supported by said core means in spaced relation to and within said housing means, said heating means having the characteristic of bending substantially in unison with said core means along the length of said assembly during insertion into and withdrawal from said curved tube.

3. A heater assembly as in claim 1, wherein said head means comprises:
   an extension of said housing means wound in a spiral pattern with a gradually decreasing diameter to define a generally closed and rounded projecting surface.

4. A heater assembly as in claim 1, wherein said head means comprises:
   a front portion and a housing means attaching portion, said housing means attaching portion received within and secured to said housing means and attached to said core means.

5. A heater assembly as in claim 1, wherein said tube has a temperature variation along the length thereof and said heater assembly further comprises:

means for measuring said temperature variation to determine the location of said head means relative to the length of said tube.

6. A heater assembly as in claim 5, wherein said temperature measuring means comprises:

at least one thermocouple positioned within said housing means and attached for movement with said head means along the length of said tube during said assembly insertion and withdrawal and having a thermocouple such that positioning of said head means relative to the length of said tube is determinable by sensing said temperature variation at said thermojunction.

7. A heater assembly as in claim 6, and further comprising:

plural thermocouples having their respective thermojunctions spaced lengthwise along and within said assembly to sense a temperature distribution along the length of said tube.

* * * * *